(12) United States Patent
Stuhaug et al.

(10) Patent No.: US 12,734,707 B2
(45) Date of Patent: Sep. 15, 2026

(54) METHOD AND VEHICLE FOR RESCUING A STALLED CONTAINER HANDLING VEHICLE

(71) Applicant: Autostore Technology AS, Nedre Vats (NO)

(72) Inventors: Ragnar Stuhaug, Skjold (NO); Ingvar Fagerland, Kolnes (NO); Trond Austrheim, Etne (NO); Ole Alexander Mæhle, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 406 days.

(21) Appl. No.: 18/556,297

(22) PCT Filed: Apr. 8, 2022

(86) PCT No.: PCT/EP2022/059482
§ 371 (c)(1),
(2) Date: Oct. 19, 2023

(87) PCT Pub. No.: WO2022/223325
PCT Pub. Date: Oct. 27, 2022

(65) Prior Publication Data

US 2024/0190017 A1 Jun. 13, 2024

(30) Foreign Application Priority Data

Apr. 20, 2021 (NO) .................................... 20210494

(51) Int. Cl.
*B25J 11/00* (2006.01)
*B25J 5/00* (2006.01)
(Continued)

(52) U.S. Cl.
CPC ............. *B25J 11/008* (2013.01); *B25J 5/007* (2013.01); *B25J 5/02* (2013.01); *B25J 9/1697* (2013.01);
(Continued)

(58) Field of Classification Search
CPC ... B25J 11/008; B25J 5/007; B25J 5/02; B25J 9/1697; B25J 15/0608; B65G 1/0464;
(Continued)

(56) References Cited

U.S. PATENT DOCUMENTS

2015/0127143 A1* 5/2015 Lindbo .................. G05B 15/02
700/218
2018/0065804 A1* 3/2018 Hognaland .......... B65G 1/0464
(Continued)

FOREIGN PATENT DOCUMENTS

CN 105370689 A 3/2016
CN 108100557 A 6/2018
(Continued)

OTHER PUBLICATIONS

Martin, Benoit, Examining communication in European Patent Office application 22721751.0, mailed Mar. 9, 2026, 5 pages, pub. by European Patent Office, Munich, Germany.
(Continued)

*Primary Examiner* — Kyle O Logan
(74) *Attorney, Agent, or Firm* — Baker Botts L.L.P.

(57) ABSTRACT

A service vehicle unit (SVU) is for manoeuvring a container handling vehicle that has stalled on an automated storage and retrieval system. The system includes a rail system having a first set of parallel rails arranged to guide movement of a container handling vehicle in a first direction (X) across the top of a frame structure, and a second set of parallel rails arranged perpendicular to the first set of rails to guide movement of the container handling vehicle in a
(Continued)

second direction (Y), which is perpendicular to the first direction (X). The first and second sets of parallel rails dividing the rail system into a plurality of grid cells. At least one container handling vehicle is configured to operate on the rail system. The SVU includes a wheel module configured with a first and second set of wheels, which enable movement of the container handling vehicle in the X and Y direction and which is configured to operate on the rail system. The SVU has a turret and a turret mounted positioner that is attached to the wheel module, and the turret rotates the turret mounted positioner horizontally to attach to the container handling vehicle, used for manoeuvring a container handling vehicle to a predetermined position on the grid by the wheel module.

20 Claims, 12 Drawing Sheets

(51) Int. Cl.

| | |
|---|---|
| ***B25J 5/02*** | (2006.01) |
| ***B25J 9/16*** | (2006.01) |
| ***B25J 15/06*** | (2006.01) |
| *B65G 1/04* | (2006.01) |
| *B65G 1/06* | (2006.01) |

(52) U.S. Cl.

CPC ......... *B25J 15/0608* (2013.01); *B65G 1/0464* (2013.01); *B65G 1/0478* (2013.01); *B65G 1/065* (2013.01); *B65G 2201/0235* (2013.01); *B65G 2203/0275* (2013.01)

(58) Field of Classification Search

CPC .................. B65G 1/0478; B65G 1/065; B65G 2201/0235; B65G 2203/0275

See application file for complete search history.

(56) References Cited

U.S. PATENT DOCUMENTS

| | | | | |
|---|---|---|---|---|
| 2018/0194571 | A1* | 7/2018 | Fryer | B65G 1/02 |
| 2018/0244467 | A1* | 8/2018 | Hognaland | B65G 1/0478 |
| 2018/0346243 | A1* | 12/2018 | Lindbo | B65G 1/065 |
| 2019/0054932 | A1* | 2/2019 | Stadie | B25J 5/007 |
| 2019/0129371 | A1 | 5/2019 | Wagner et al. | |
| 2019/0375588 | A1* | 12/2019 | Lindbo | B65G 1/0464 |
| 2020/0031575 | A1* | 1/2020 | Hognaland | B65G 1/0464 |

FOREIGN PATENT DOCUMENTS

| | | | |
|---|---|---|---|
| EP | 3782935 | A1 | 2/2021 |
| NO | 317366 | B1 | 10/2004 |
| WO | 2014075937 | A1 | 5/2014 |
| WO | 2014090684 | A1 | 6/2014 |
| WO | 2015140216 | A1 | 9/2015 |
| WO | 2015193278 | A1 | 12/2015 |
| WO | 2017148939 | A1 | 9/2017 |
| WO | 2018146304 | A1 | 8/2018 |
| WO | 2019101725 | A1 | 5/2019 |
| WO | 2019206487 | A1 | 10/2019 |
| WO | 2019206672 | A2 | 10/2019 |
| WO | 2019233632 | A1 | 12/2019 |
| WO | 2020094339 | A1 | 5/2020 |
| WO | 2020151866 | A1 | 7/2020 |

OTHER PUBLICATIONS

Rognan, Tove Kathrine, Office Action in Norwegian patent application No. 20210494, mailed Feb. 17, 2026, 5 pages, pub. by Norwegian Industrial Property Office, Oslo, Norway.

Wei, Lijiao, Office Action in CN202280029715.2, mailed Jul. 23, 2025, 30 pages, The State Intellectual Property Office of the People's Republic of China, Beijing, China.

International Search Report issued in International Application No. PCT/EP2022/059482, mailed Aug. 25, 2022 (3 pages).

Written Opinion issued in International Application No. PCT/EP2022/059482; Dated Aug. 25, 2022 (7 pages).

Search Report issued in Norwegian U.S. Appl. No. 20/210,494; Dated Nov. 19, 2021 (2 pages).

Tachibana, Akira, Office Action in Japan patent application 2023563975, mailed Apr. 30, 2026, 4 pages, Japan Patent Office, Tokyo, Japan.

* cited by examiner

METHOD AND VEHICLE FOR RESCUING A STALLED CONTAINER HANDLING VEHICLE

The present invention relates to an automated storage and retrieval system for storage and retrieval of containers, in particular to a method and a vehicle for rescuing container handling vehicles that have stalled on the grid.

BACKGROUND AND PRIOR ART

FIG. 1 discloses a prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301,401 comprises a vehicle body **201*a*,301*a*,401*a* and first and second sets of wheels 201*b*,301*b*,201*c*,301*c*,401*b*,401*c* which enable the lateral movement of the container handling vehicles 201,301,401 in the X direction and in the Y direction, respectively. In FIGS. 2, 3 and 4 two wheels in each set are fully visible. The first set of wheels 201*b*,301*b*, 401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*,301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111** at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body **201*a* in FIG. 2**.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5 The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body **201*a* as shown in FIGS. 2 and 4** and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks, and each rail may comprise multiple parts.

WO2018/146304A1, the contents of which are incorporated herein by reference, illustrates a typical configuration of rail system 108 comprising rails and parallel tracks in both X and Y directions.

EP 3782935 A describes a robotic service device used in an automated storage and retrieval system for performing maintenance operations. The robotic device is provided with docking mechanism to rescue malfunctioning load handling devices.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The container may be transported on a conveyor belt from the port column to the access station. The container may also be transported to the access station from the port column by a container handling vehicle. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

A container handling vehicle that breaks down on the grid usually breaks down between two cells, and in most cases the problem is fixed by moving the container handling vehicle to a known location and restarting the vehicle. The known location can be the closest column in relation to where the container handling vehicle broke down. However, the solutions disclosed in the prior art present solutions where the container handling vehicle that has stalled or broken down has to be taken into a service area and where an operator is required to try to restart the container handling vehicle.

When a container handling vehicle has stalled or broken down on the grid it has to be transported from the grid either by a person manoeuvring onto the grid and physically pushing the container handling vehicle to the service area, or another solution is to get a specialised service robot to transport the vehicle to the service area. All of these solutions demand that the grid has to be either completely or partially shut down while the container handling vehicle is transported to the service area.

These solutions are time consuming and expensive since the container handling vehicle has to be transported to the service area and the shutting down of the grid means that the grid is not operating at full capacity leading to downtime and potential costs associated with loss in income.

SUMMARY OF THE INVENTION

The present invention is set forth and characterized in the independent claims, while the dependent claims describe other characteristics of the invention.

In one aspect, the invention is related a service vehicle unit (SVU) for manoeuvring a container handling vehicle that has stalled on an automated storage and retrieval system, wherein the system comprises: a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the SVU comprises a wheel module configured with a first and second set of wheels which enable movement of the container handling vehicle in the X and Y direction and which can be configured to operate on the rail system wherein the SVU has a turret and a turret mounted positioner that is attached to the wheel module, and the turret rotates the turret mounted positioner horizontally to attach to the container handling vehicle, used for manoeuvring a container handling vehicle to a predetermined position on the grid by the wheel module.

Further wherein the turret mounted positioner may have a suction device for attaching to the container handling vehicle and the suction device can be powered by a pneumatic pump. The turret mounted positioner may have a camera with a transmitter. The turret can be rotated horizontally using a motor driving the turret mounted positioner. The motor rotating the turret mounted positioner can be an electric motor.

Also the turret mounted positioner may have an electromagnet for attaching to the container handling vehicle, the SVU may have a linear actuator for extending and retracting the turret mounted positioner, or the SVU may have a pneumatic cylinder for extending and retracting the turret mounted positioner or the SVU may have an electromotor driving a rack and pinion system for extending and retracting the turret mounted positioner, the turret and the turret mounted positioner can be controlled by a control box top module of the SVU and the turret mounted positioner can be raised and lowered.

Further the suction device can be raised and lowered in order to engage with the container handling vehicle. Also the centre of the wheels on the wheel module can have spacers that register when the container handling vehicle is in position in the predetermined position on the grid, and the spacers can register when the container handling vehicle is in position in the predetermined position on the grid by the container handling vehicle touching the spacers, and the predetermined position on the grid can be the vacant cell between the SVU and the container handling vehicle, or the predetermined position on the grid can be a service area.

Further the turret mounted positioner can have a stopper for ensuring that the turret mounted positioner does not rotate more than maximum 360°, and the stopper can be used for calibrating the position of the turret mounted positioner.

In a second aspect, the invention concerns A method for operating a service vehicle unit (SVU) for manoeuvring a container handling vehicle that has stalled on an automated storage and retrieval system wherein the system comprises: a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the SVU comprises a wheel module which is configured to operate on the rail system wherein the method is comprised of the following steps: a central computer system notifying the SVU about a stalled container handling vehicle, the central computer system sending the SVU to the last know position of the stalled container handling vehicle, the central computer system positioning the SVU in relation to the container handling vehicle in such a way that the turret mounted positioner can be used to manoeuvre the container handling vehicle to a predetermined cell on the grid, the SVU repositioning the stalled container handling vehicle, the central computer system trying to restart the container handling vehicle using the central computer system from the predetermined position on the grid.

Also the method comprises remotely controlling the SVU using a central computer system, and the repositioning of the container handling vehicle step is further comprised of: the SVU extending the turret mounted positioner and coupling it to the stalled container handling vehicle, the SVU manoeuvring the container handing vehicle using the turret to manoeuvre the container handling vehicle to a known position on the grid, the SVU decoupling the turret mounted positioner from the container handling vehicle.

Further the central computer system locating the stalled container handling vehicle using a camera and wherein the camera can be mounted on the end of the turret on the SVU. The method comprises remotely controlling the SVU using an operator to locate the broken-down container handling vehicle and to steer the SVU.

The method comprises using the suction device on the end of the turret of the SVU to attach the turret mounted positioner to the container handling vehicle, or the method comprises using the electromagnet on the end of the turret of the SVU to couple the turret mounted positioner to the container handling vehicle. Alternatively, the method comprises pushing the container handling vehicle using the suction device for pushing the container handling vehicle or the method comprises pushing the container handling vehicle using the electromagnet.

Also the method comprises receiving images from a camera mounted to the end of the turret mounted positioner allowing an operator to operate the turret and the turret mounted positioner, or receiving images from a camera mounted to the end of a turret mounted positioner allowing the central computer system to manoeuvre the turret mounted positioner based on image recognition software applied to the images from the camera.

The method comprises extending and retracting the turret mounted positioner using a pneumatic cylinder powered by a pneumatic pump, an electric motor powering a rack and pinion system or a linear actuator.

The wheelbase may comprise a body corresponding to a grid space of a single cell. It is shorter in height than a container handling vehicle. It is motorized and can travel in x and y directions. It is powered by a battery which drives the motors. Further, it includes a mount and a control system for the turret. The small footprint allows it to lower its wheels and lock into the grid. Also, it allows it to position the stalled vehicle accurately in an adjacent cell.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
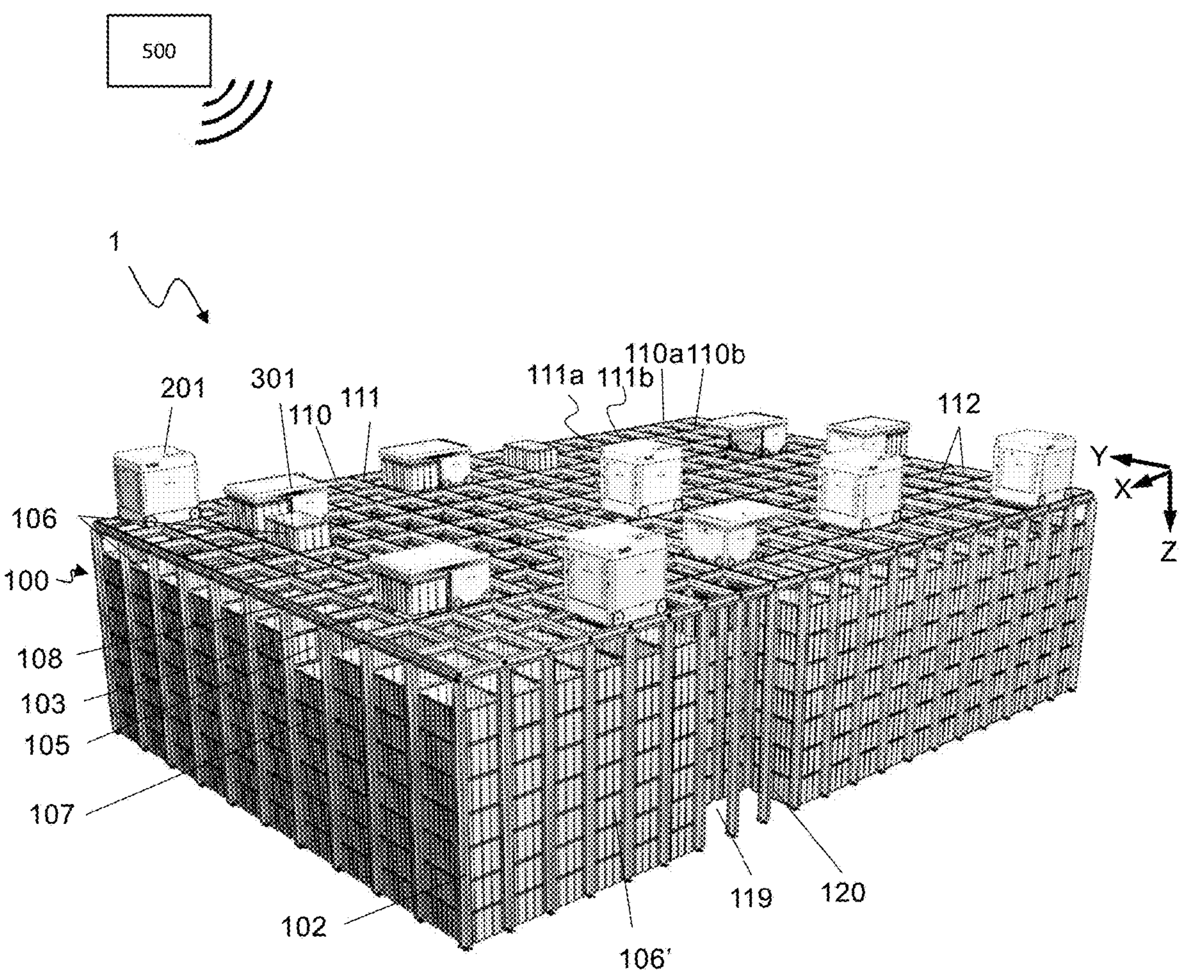
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
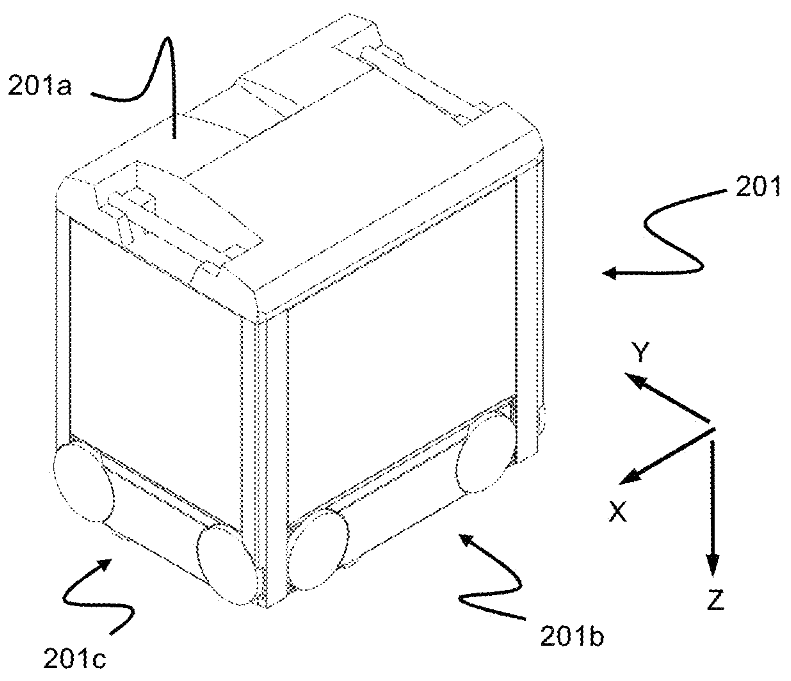
FIG. 2 is a perspective view of a prior art container handling vehicle having a centrally arranged cavity for carrying storage containers therein.
Figure 3:
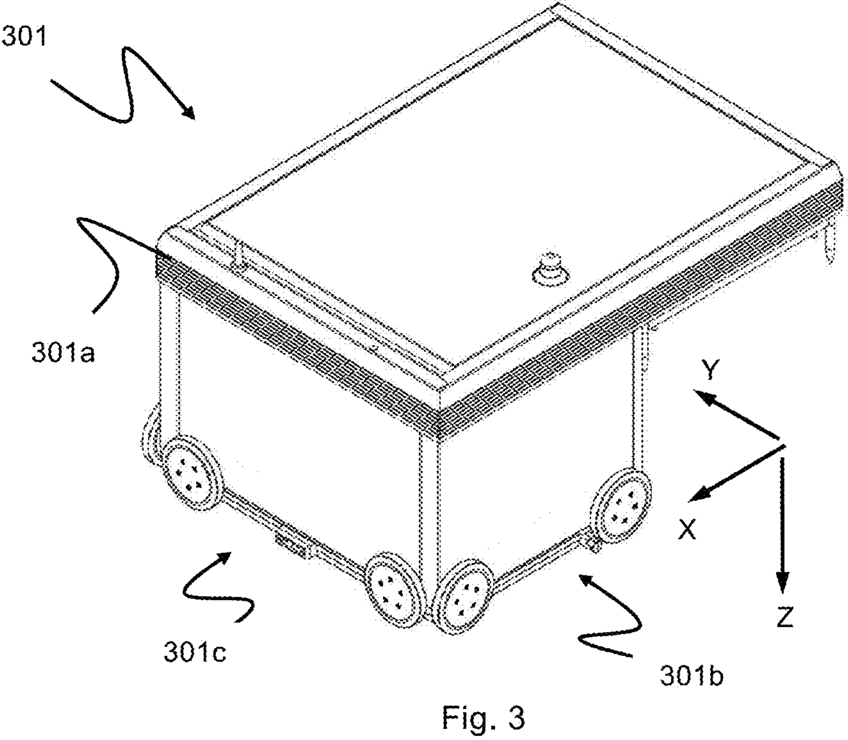
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 5-13

Figure 4:
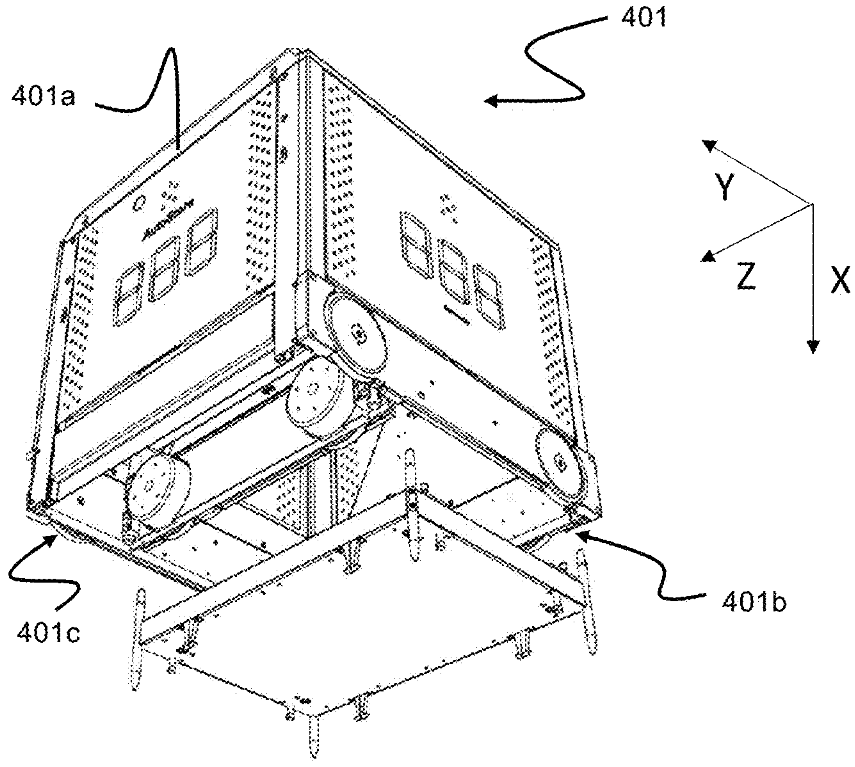
FIG. 4 a perspective view of a prior art container handling vehicle having a centrally arranged cavity for carrying storage containers therein with a footprint which is larger than the lateral area defined by a storage column.

FIG. 4 a perspective view of a prior art container handling vehicle having a centrally arranged cavity for carrying storage containers therein with a footprint which is larger than the lateral area defined by a storage column 105.

Figure 5:
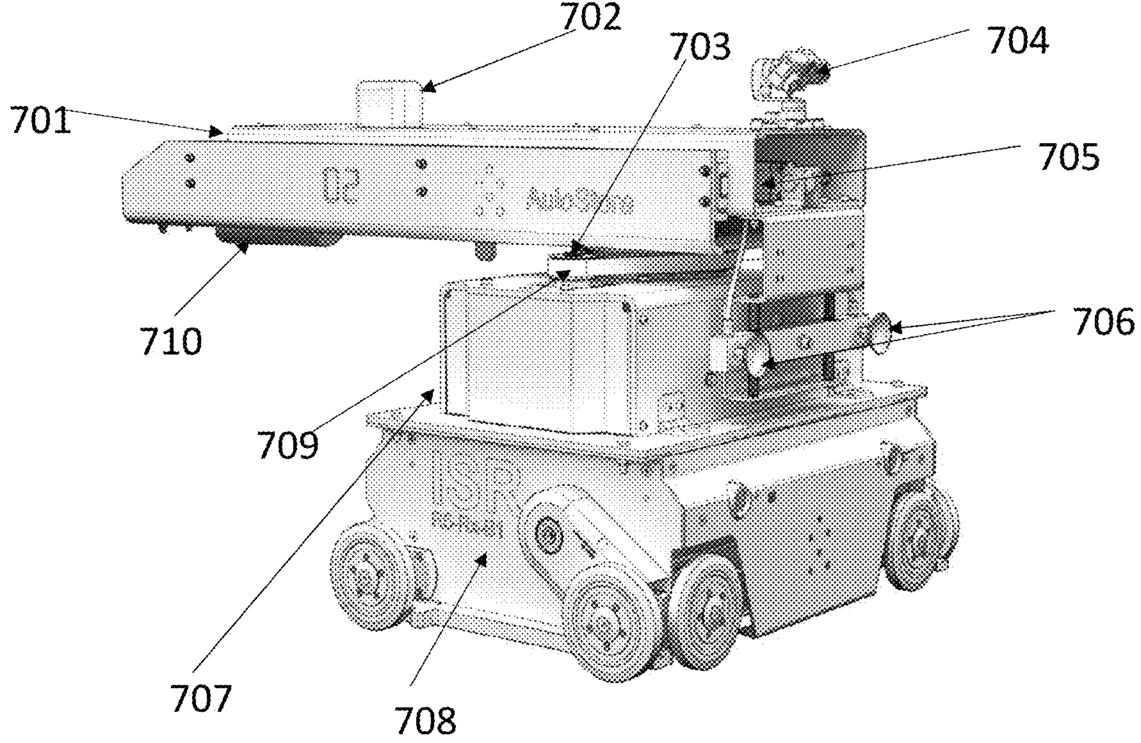
FIG. 5 is a perspective view of a Service Vehicle Unit (SVU) with a turret mounted positioner.

FIG. 5 is a perspective view of a Service Vehicle Unit (SVU) with a turret mounted positioner 701.

The present invention regards a Service Vehicle Unit (SVU) for aiding a container handling vehicle that has stalled or broken down on the grid. A container handling vehicle that stalls or breaks down on the grid, usually does so between two cells and in most cases the problem is fixed by moving the container handling vehicle to a known location and restarting the vehicle. The known location can be the closest column (grid space) in relation to where the container handling vehicle broke down.

The SVU is comprised of at least one-wheel module 708. The wheel module 708 is comprised of a comprises a vehicle body and first and second sets of wheels which enable the lateral movement of the container handling vehicles in the X direction and in the Y direction, respectively. The first set of wheels is arranged to engage with two adjacent rails of the first set of rails, and the second set of wheels is arranged to engage with two adjacent rails of the second set of rails. The SVU may be configured so that the wheel module 708 corresponds in size to the area of a single storage column 105 (grid space) including the area of the track of the rail that the wheels run along. At least one of the sets of wheels can be lifted and lowered, so that the first set of wheels and/or the second set of wheels can be engaged with the respective set of rails at any one time. Further the wheel module 708 comprises an electric motor for providing power to the set of wheels. Also, the wheel module 708 can have a battery that can provide power to the electric motor. The battery can be rechargeable (either in situ or remotely from the SVU), and it can also provide power to the rest of the SVU.

There is attached a top module to the wheel module 708. The top module is comprised of a SVU controller 802. The top module comprises further a positioner connected to the SVU-controller. The SVU-controller controls the position and rotation of the turret mounted positioner 701. The turret mounted positioner 701 is rotated by an electric motor that turns a gear and the turret mounted positioner 701 in either direction via a belt 709.

Figure 9:
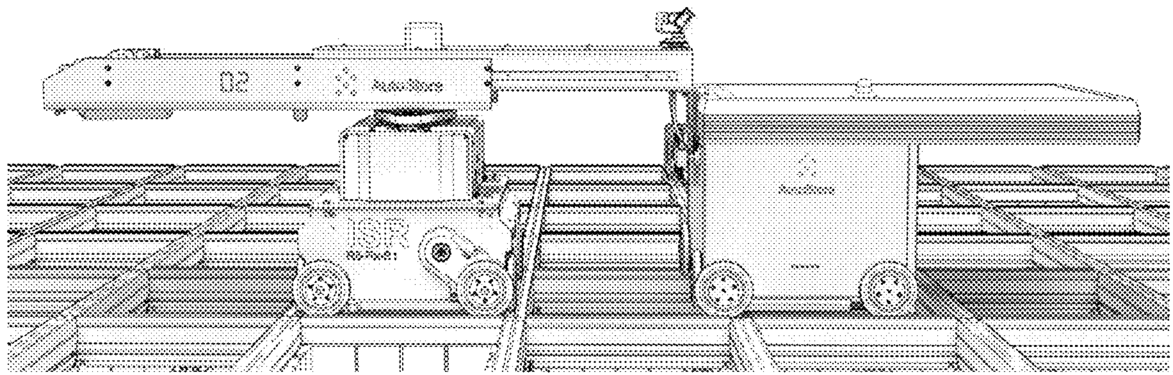

The turret mounted positioner 701 may be comprised of at least two parts. The turret mounted positioner 701 may be telescopic, e.g., as shown in FIG. 9, and extends at least the width of a cell. The extension and retraction of the turret mounted positioner 701 can be done by a pneumatic cylinder 705. Alternatively, the extension and retracting of the turret mounted positioner 701 can be achieved by a rack and pinion system. Where the extension and retraction are performed by a pneumatic cylinder 705, the pneumatic cylinder 705 may be controlled by an air reservoir 710. In addition, there can be a compressor in order to maintain the air pressure in the air reservoir 710.

In a preferred solution the extension and retracting of the turret mounted positioner 701 is done by a linear actuator.

Figure 6:
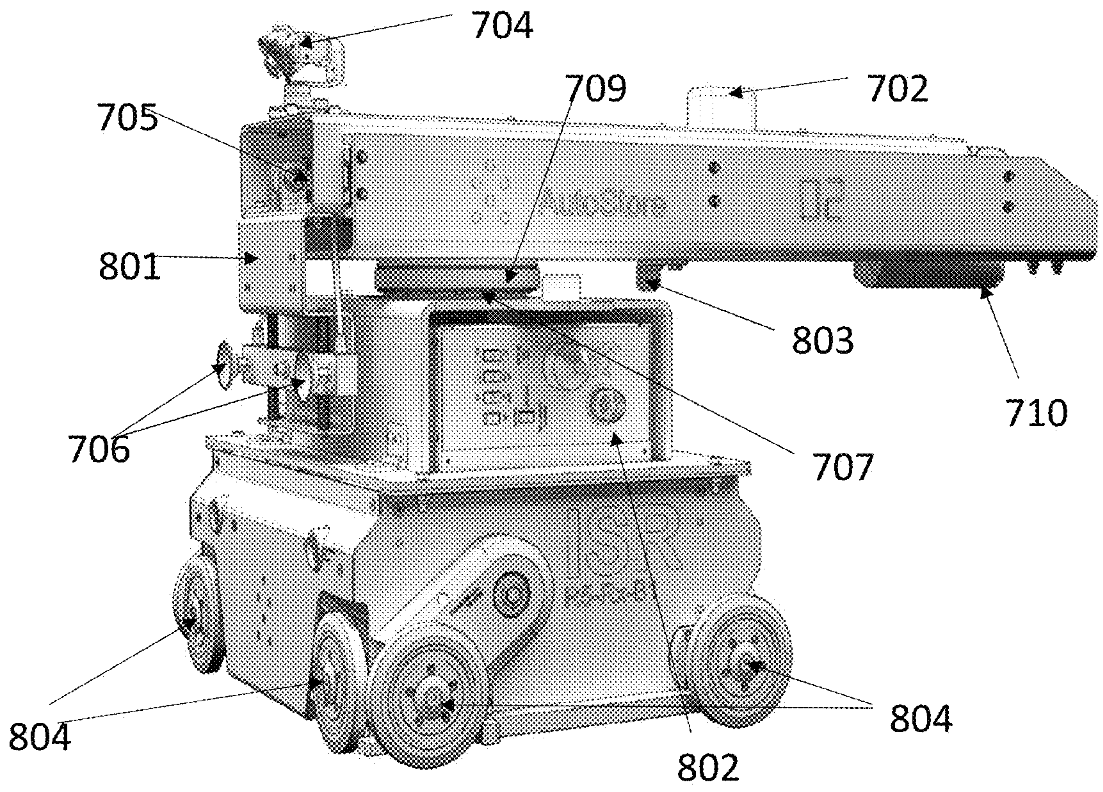
FIG. 6 is a perspective view of the opposite side of the Service Vehicle Unit (SVU) with a turret mounted positioner presented in FIG. 5.

FIGS. 5 and 6 show perspective views of the SVU from different sides. The turret mounted positioner 701 is controlled by a positioner controller box 702. The top module controller box operates the turret mounted positioner 701 on instructions from a central computer system. Alternatively, the instructions can be sent by an operator.

The instructions are received by a radio receiver. The central computer system or the operator receive images from a camera 704 connected to a transmitter. The camera 704 allows the central computer system or the operator to locate the stalled or broken-down container handling vehicle to be located precisely. Further it allows the central computer system or the operator to control the connection to the stalled or broken-down container handling vehicle. Since the central computer system does not know precisely where the stalled or broken-down container handling vehicle is, the central computer system needs to otherwise determine where the stalled or broken-down container handling vehicle is in order to know how to attach and move the container handling vehicle. In a preferred embodiment the camera 704 and the transmitter is placed at the end of the turret mounted positioner 701. However, the camera 704 can be placed anywhere else on the SVU that gives the camera 704 a view of the container handling vehicle.

At the end of the turret mounted positioner 701, that is to connect to the container handling vehicle, there is an engagement face 801. The engagement face 801 has means for attaching the turret mounted positioner 701 to the container handling vehicle that has stalled or broken down.

In a preferred embodiment of the present invention the means for attaching the turret mounted positioner 701 to the container handling vehicle can be a set of suction device 706. The suction device 706 can connect to any side of the container handling vehicle. The suction device 706 can be powered by the battery in the wheel module 708, or the top module may include its own power source (e.g., battery or capacitor).

In a preferred embodiment of the present invention the suction device 706 or the electro magnet used for attaching to the container handling vehicle in order to pull the container handling vehicle towards the SVU can also be used for pushing the container handling vehicle to a free cell on the other side of the container handling vehicle relative to the SVU.

In another solution the turret mounted positioner 701 can attach to the container handling vehicle by using an electromagnet. The electromagnet can be powered by the battery in the wheel module 708 or another power source (e.g., battery or capacitor in the top module). In yet another solution the turret mounted positioner 701 can be attached to the container handling vehicle by using a hook or loop made of wire or rope or something similar. These solutions can also be in addition to the suction cups 706 or the electromagnet.

In another solution the turret mounted positioner 701 can also be moved in a vertical direction. This is in order to be able to connect better to the container handling vehicles that has stalled or broken-down. If the container handling vehicle has e.g. a cantilever solution it can be a problem connecting to the cantilever side. There can therefore be benefits with either raising or lowering the turret mounted positioner 701 vertically to connect properly with the container handling vehicle.

When the turret mounted positioner 701 is connected to the container handling vehicle with suction device 706, the turret mounted positioner 701 can use the suction provided by the suction device 706 to drag the container handling vehicle to the closest free column.

The suction device 706 can also be raised and lowered in order to be able to connect properly with the container handling vehicle.

Alternatively, the turret mounted positioner 701 can push or nudge the container handling vehicle to the closest free column.

When the SVU is moving the container handling vehicle, all the wheels of the wheel module 708 may be down in order to lock the SVU in position. The SVU can also control the wheels of the container handling vehicle in order to be able to maneuver the container handling vehicle. the footprint of the SVU can be the size of a single cell or it can be larger. It has a front side which is at most flush with the middle of the rail when all its wheels are lowered, and it is locked in place over the storage column 105. In that way, it can drag the stalled vehicle back to a position where it is exactly over a storage column 105 which can then help the resetting of the positioning sensors.

The action of knowing it can have all eight wheels in contact with rails will signal to the robot that it is at a given grid position.

The SVU can also transport the container handling vehicle to a dedicated service station for further repairs.

When the SVU is in the desired position, the system can send track shift commands to the stalled container handling vehicle, so that it will place itself in "midpos" with all 8 wheels down. From that position, the robot can either try to restart itself, or stay parked until a later time. If the robot is parked (in "Delayed Stop") and is either waiting for a rescue drone, or for the operator to fetch the robot, the bin below it may be needed. In such case, the rescue drone many move the robot one cell away for the below containers to be accessed.

The present invention solves the problem by moving the container handling vehicle to the closest available cell. The SVU is made up of a wheel module 708 onto which a turret with a positioner is attached. The turret can swing the turret mounted positioner 701 around in both directions and is driven by an electric motor 703. The turret mounted positioner 701 is originally intended to only be movable in a horizontal plane, but in an alternative embodiment of the present invention it is able to move the turret mounted positioner 701 also in a vertical plane in order to be adaptable to different types of container handling vehicles. In yet another embodiment of the present invention the engagement face 801 at the end of the turret mounted positioner 701 can be manoeuvred in order to be adaptable to different types of container handling vehicles. It can also be necessary to adjust the height of the turret in order to be able to attach to the cantilever side of a container handling vehicle with a cantilever solution.

There are two methods for attaching to the container handling vehicle. The turret mounted positioner 701 can have suction device 706 powered by a pneumatic pump that can connect to any side of the container handling vehicle. In an alternative solution the suction device 706 can be exchanged with an electromagnet.

The turret mounted positioner 701 can also be used to push the container handling vehicle to a cell. The turret mounted positioner 701 can therefore have a plate at the end that is padded in order to not harm the container handling vehicle.

The method is that the SVU approaches the container handling vehicle that has broken down. The SVU positions itself in such a way that it is able to connect to the container handling vehicle. The SVU has a Camera 704 on the end of the turret mounted positioner 701 which allows for an operator to remotely operate the turret and the turret mounted positioner 701. The turret mounted positioner 701 is extended so it interacts with the container handling vehicle. Either the suction or the electromagnet attaches to a side of the container handling vehicle and the SVU pulls the container handling vehicle towards itself until the it is positioned in the available cell.

Alternatively, the SVU can push the container handling vehicle using its positioner to a cell on the grid that is available, and the central computer system can attempt to restart the container handling vehicle.

FIG. 6 is a perspective view of the opposite side of the Service Vehicle Unit (SVU) with a turret mounted positioner 701 presented in FIG. 5.

This is an image of the opposing side of the SVU than the one given in the FIG. 5. In the image the engagement face 801 is attached to the end of the turret mounted positioner 701. The devices used for attaching the turret mounted positioner 701 to the container handling vehicle can be fixed to the engagement face 801. The devices used for attaching the turret mounted positioner 701 to the container handling vehicle could be the suction device or the electromagnet discussed above.

In addition, it is possible to see the SVU-controller, this SVU-controller controls the position and rotation of the top module.

In a preferred embodiment of the present invention the SVU has a footprint of a single cell. However, there are possibilities for the SVU to have a footprint that is larger than this. This can be due to the wheel module 708 being bigger than one single cell or it can be due to there being more than one wheel module 708.

A larger wheel module 708 or several wheel module's 708 will be able to ensure a better foundation for the SVU ensuring that it is sturdier when it is pushing or pulling a container handling vehicle.

The turret mounted positioner 701 comprises a cantilevered arm. The cantilevered arm has a length longer than a grid space. Further the cantilevered arm is telescopic and is comprised of at least two parts sliding into each other. Because it is not lifting a load, the end of the turret mounted positioner 701 can extend to greater distances than the cantilever of the cantilevered container handling vehicle. The fact that the cantilever extends out back from the SVU makes it possible to counterbalance an extended portion of the turret mounted positioner 701 by the cantilever of the remainder of the turret mounted positioner 701 when it is extended. This may allow the arrangement to support a greater moment of rotation and so reach further.

A stopper 803 is used for ensuring that the turret mounted positioner does not rotate more than maximum 360°, and the stopper 803 can be used for calibrating the position of the turret mounted positioner. The stopper also ensures that the cables inside the turret and the turret mounted positioner is not twisted too much.

The centre of the wheels on the wheel module has spacers 804 that register when the container handling vehicle is in position in the predetermined position on the grid. The spacers 804 register when the container handling vehicle is in position in the predetermined position on the grid by the container handling vehicle touching the spacers 804. The SVU register the container handling vehicle touching the spacers and sends a signal to the central computer system that the container handling vehicle is in place on the grid and the attempt on restarting the container handling vehicle can be started.

In another solution to this embodiment the telescopic positioner of the SVU can be replaced with a robotic arm. This arm may have a gripper at the end which allows for gripping onto a part of the container handling vehicle and manoeuvring the container handling vehicle to a predetermined location.

FIG. 7-13 is perspective view illustrations of the Service Vehicle Unit (SVU) performing a rescue of a stalled container handling vehicle on the grid according to an embodiment of the invention.

Figure 7:
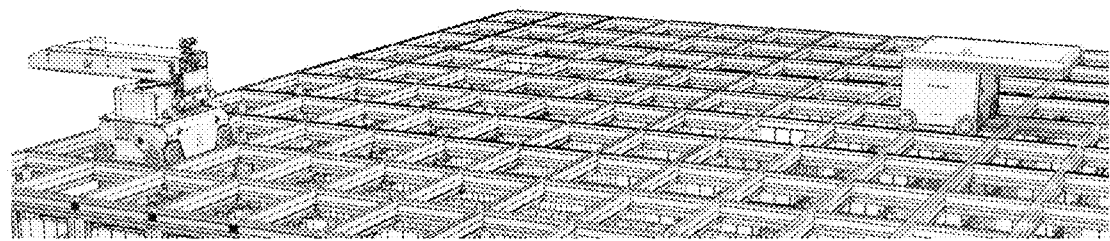
FIG. 7-13 are perspective view illustrations of the Service Vehicle Unit (SVU) performing a rescue of a stalled container handling vehicle on a grid according to an embodiment of the invention.

FIG. 7 shows a central computer system notifying the SVU about a stalled container handling vehicle.

Figure 8:
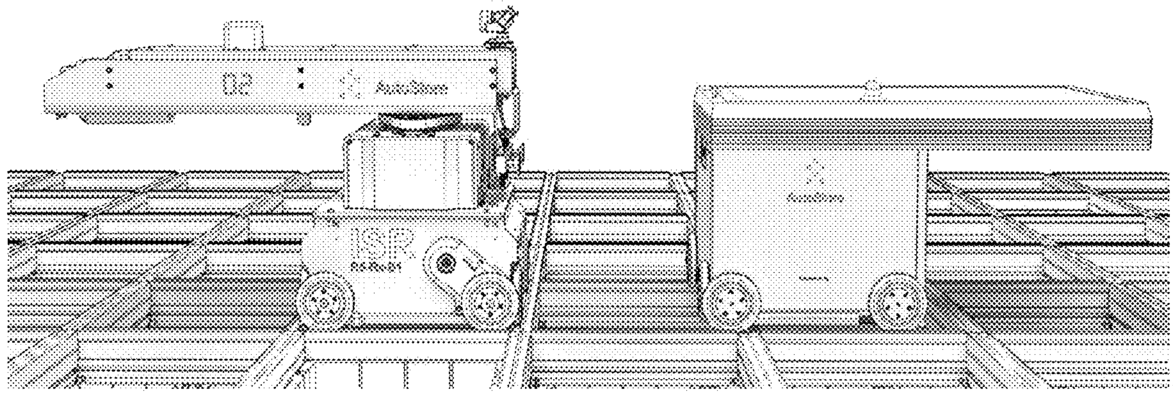

FIG. 8 shows the central computer system sending the SVU to the last know position of the stalled container handling vehicle.

Figure 10:
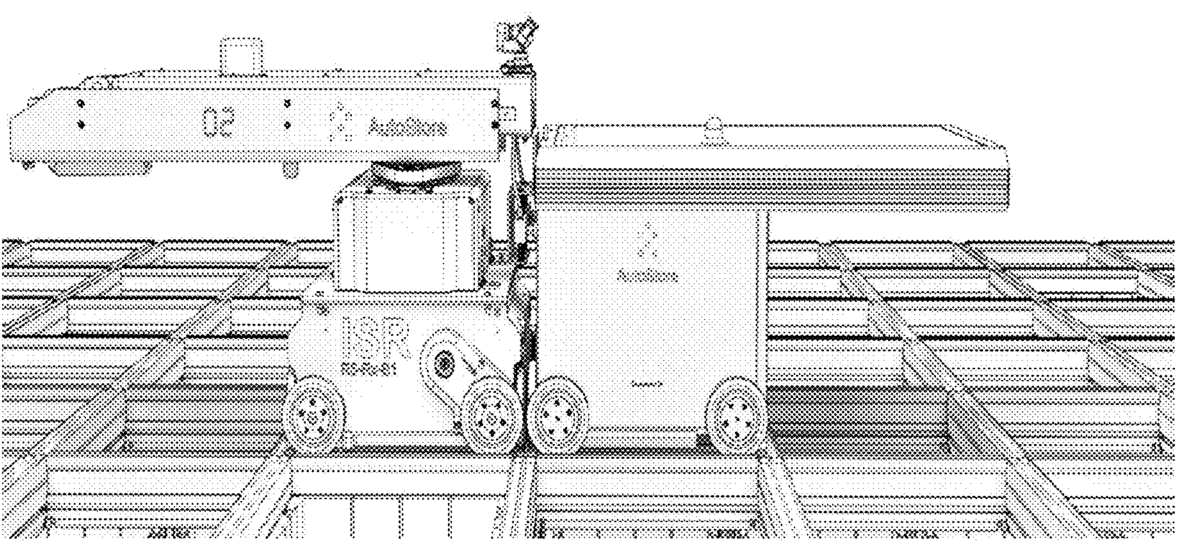

FIG. 9 shows the central computer system locating the stalled container handling vehicle using a camera 704 mounted on the end of the turret mounted positioner 701 on the SVU. The central computer system positions the SVU in relation to the container handling vehicle in such a way that the turret mounted positioner 701 can be used to manoeuvre the container handling vehicle to a predetermined cell on the grid, the SVU extends the turret mounted positioner 701 and coupling it to the stalled container handling vehicle, FIG. 10 shows the SVU manoeuvring the container handing vehicle using the turret and the turret mounted positioner 701 to a known position on the grid.

Figure 11:
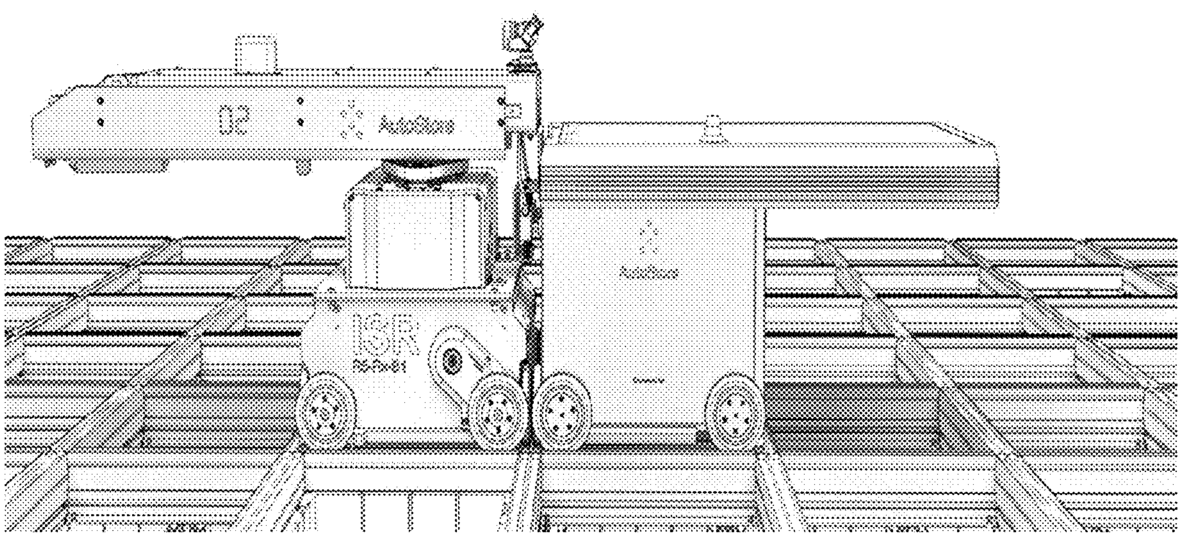

FIG. 11 shows the wheel module 708 going from the standing position to the traveling position. This is done by raising one set of the wheels so that not all of the wheels are down at one time. The standing position is regarded as the position where all of the wheels are placed in the tracks of the grid (e.g., as shown in FIG. 10). This standing position helps to lock the SVU in position on the grid in order to prevent the SVU from moving while handling the stalled or stranded container handling vehicle. The traveling position is where only the wheels in one direction is in touch with the tracks on the grid.

Figure 13:
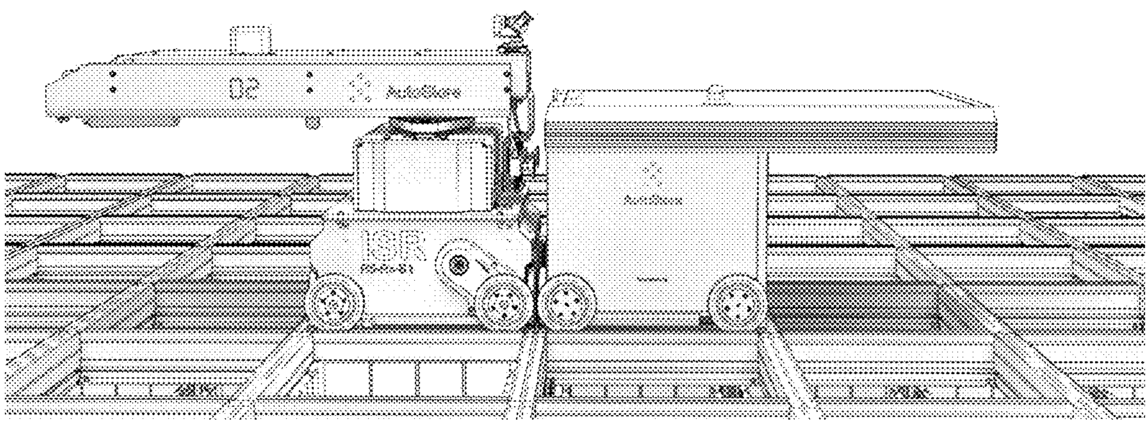
Figure 12:
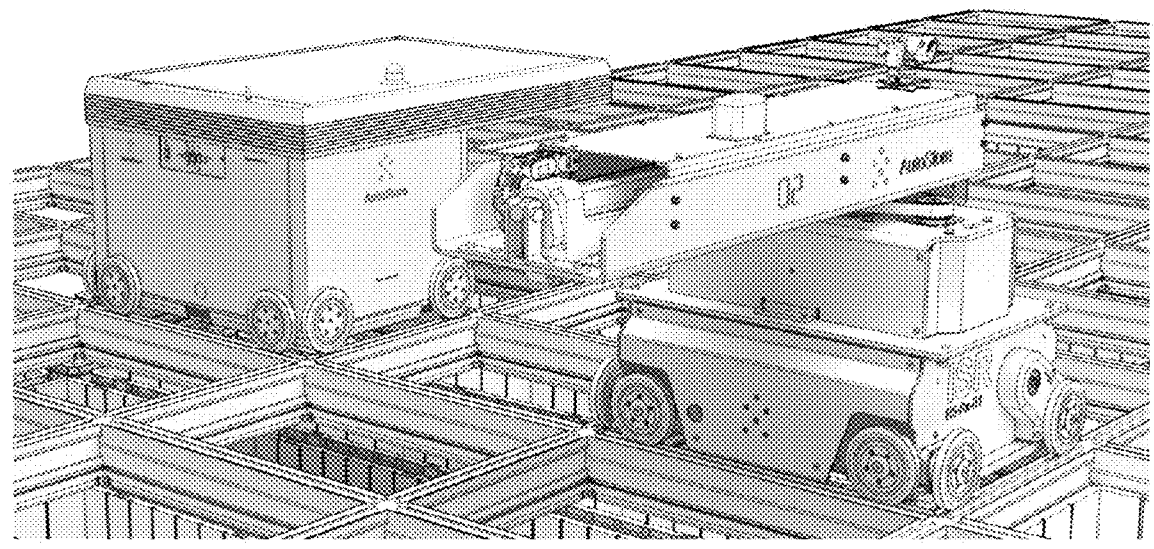

FIG. 12 shows the SVU decoupling the turret mounted positioner 701 from the container handling vehicle, FIG. 13 shows the central computer system trying to restart the container handling vehicle using the central computer system from the predetermined position on the grid, and the SVU moving away from the container handling vehicle.

Figure 14:
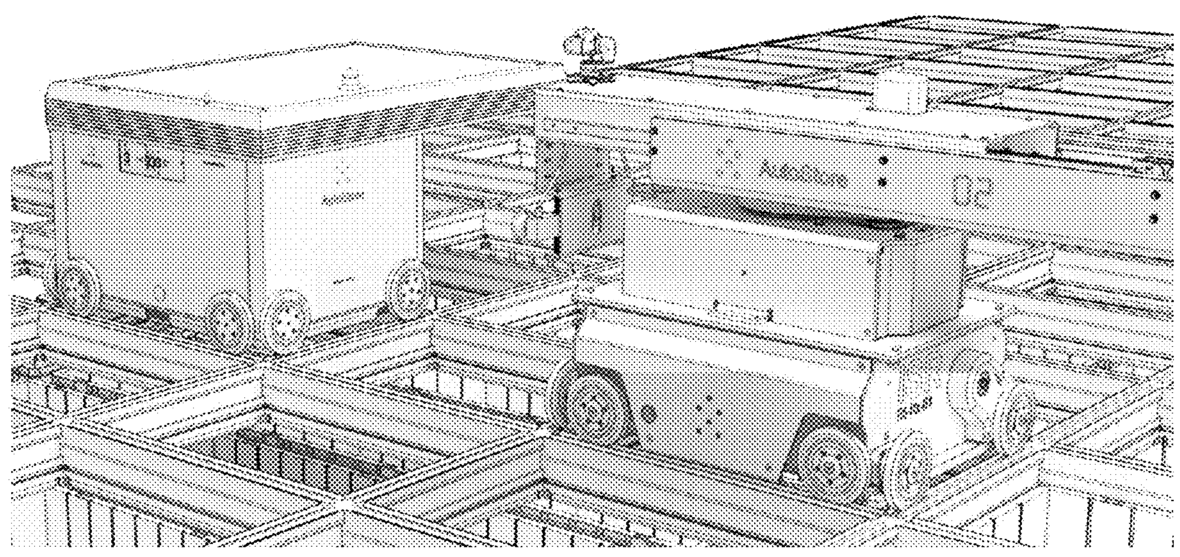
FIG. 14-16 is perspective view illustrations of the Service Vehicle Unit (SVU) performing a rescue of a stalled container handling vehicle on the grid according to an embodiment of the invention wherein the SVU engages with the stalled or broken down container handling vehicle from a side that is 90° to the side presented in FIG. 7-13.
Figure 15:
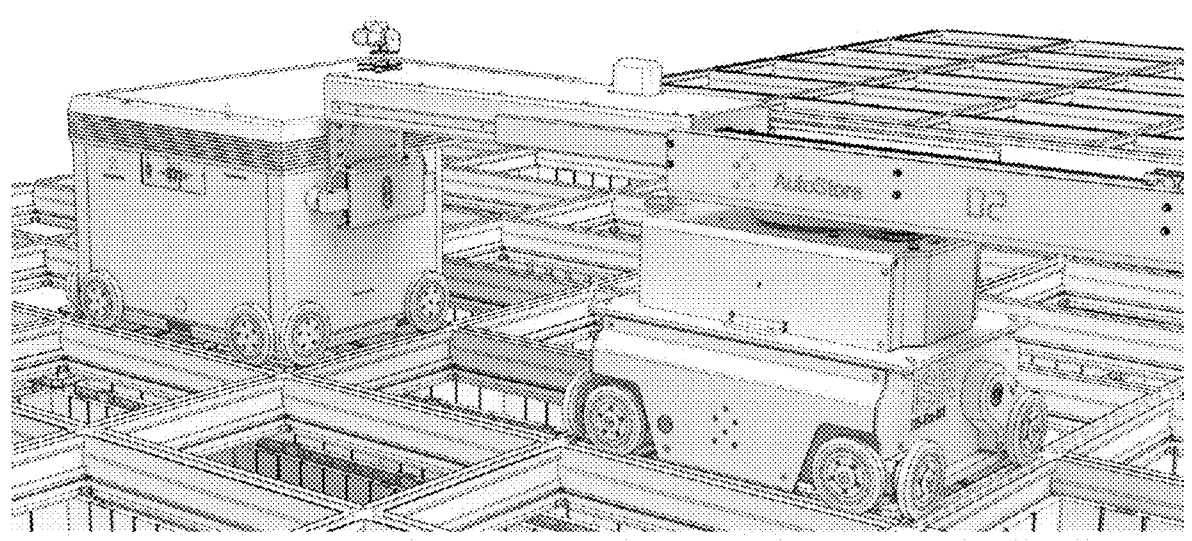
Figure 16:
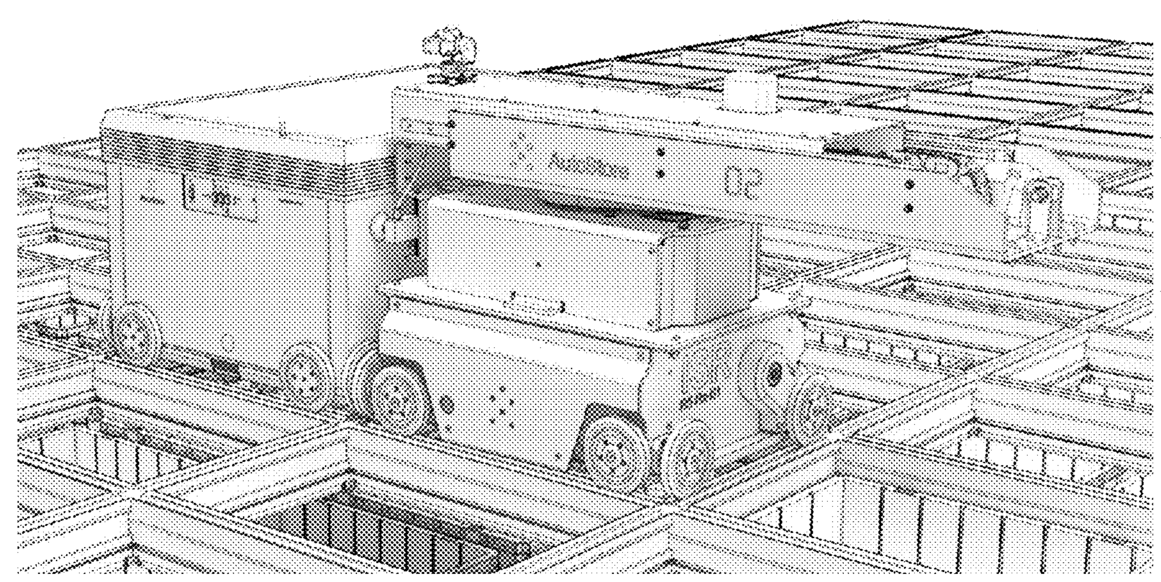

FIG. 14-16 is perspective view illustrations of the Service Vehicle Unit (SVU) performing a rescue of a stalled container handling vehicle on the grid according to an embodiment of the invention wherein the SVU engages with the stalled or broken down container handling vehicle from a side that is 90° to the side presented in FIG. 7-13. This is to demonstrate that the SVU can engage the container handling vehicle from any side.

FIG. 14 shows the central computer system positioning the SVU in relation to the container handling vehicle in such a way that the turret mounted positioner 701 can be used to manoeuvre the container handling vehicle to a predetermined cell on the grid, the SVU extends the turret mounted positioner 701 and coupling it to the stalled container handling vehicle, FIG. 15 shows the turret and the turret mounted positioner 701 attaching to the stalled container handling vehicle.

FIG. 16 shows the SVU manoeuvring the container handing vehicle using the turret and the turret mounted positioner 701 to a known position on the grid.

In an addition there is a solution where the SVU can manoeuvre the container handling vehicle back to a service are for further maintenance. Also, the SVU might be able to manipulate the wheels on the container handling vehicle in order to ensure that it is possible to move the container handling vehicle.

The manipulating of the wheels of the container handling vehicle can be done mechanically by turning a winding mechanism accessible on the container handling vehicle in order to raise or lower a set of wheels.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIGS. 1-4):
- 100 Framework structure
- 102 Upright members of framework structure
- 103 Horizontal members of framework structure
- 104 Storage grid
- 105 Storage column
- 106 Storage container
- 106' Particular position of storage container
- 107 Stack
- 108 Rail system
- 110 Parallel rails in first direction (X)
- 110*a* First rail in first direction (X)
- 110*b* Second rail in first direction (X)
- 111 Parallel rail in second direction (Y)
- 111*a* First rail of second direction (Y)
- 111*b* Second rail of second direction (Y)
- 112 Access opening
- 119 First port column
- 120 Second port column
- 201 Prior art storage container vehicle
- 201*a* Vehicle body of the storage container vehicle 101
- 201*b* Drive means/wheel arrangement, first direction (X)
- 201*c* Drive means/wheel arrangement, second direction (Y)
- 301 Prior art cantilever storage container vehicle
- 301*a* Vehicle body of the storage container vehicle 101
- 301*b* Drive means in first direction (X)
- 301*c* Drive means in second direction (Y)
- 401 Prior art container handling vehicle
- 401*a* Vehicle body of the container handling vehicle 401
- 401*b* Drive means in first direction (A)
- 401*c* Drive means in second direction (Y)
- X First direction
- Y Second direction
- Z Third direction
- 701 The turret mounted positioner
- 702 Positioner controller box
- 703 Motor driving the turret mounted positioner
- 704 Camera with transmitter
- 705 Pneumatic cylinder
- 706 Suction cups
- 707 Turret
- 708 Wheel module
- 709 Belt from motor to positioner.
- 710 Air reservoir
- 801 Engagement face
- 802 SVU controller
- 803 Stopper
- 804 Spacer

The invention claimed is:

1. A service vehicle unit (SVU) for maneuvering a container handling vehicle that has stalled on an automated storage and retrieval system having a rail system comprising a first set of parallel rails arranged to guide movement of a container handling vehicle in a first direction across the top of a frame structure, and a second set of parallel rails arranged perpendicular to the first set of rails to guide movement of the container handling vehicle in a second direction, which is perpendicular to the first direction, the first and second sets of parallel rails dividing the rail system into a plurality of grid cells, and at least one container handling vehicle configured to operate on the rail system, wherein the SVU comprises:

a wheel module configured with a first and second set of wheels, which enables movement in the first and second direction and which is configured to operate on the rail system, a turret; and a turret mounted positioner that is attached to the wheel module, wherein the turret is configured to move the turret mounted positioner to attach to the container handling vehicle, and wherein the turret mounted positioner is configured for maneuvering a container handling vehicle to a predetermined position on the grid.

2. The SVU according to claim 1, wherein the turret is configured to rotate the turret mounted positioner horizontally to attach to the container handling vehicle.

3. The SVU according to claim 1, wherein the turret mounted positioner has a suction device for attaching to the container handling vehicle, wherein the suction device is powered by a pneumatic pump.

4. The SVU according to claim 1, wherein the turret mounted positioner has a camera with a transmitter.

5. The SVU according to claim 1, wherein the turret is rotated horizontally using a motor driving the turret mounted positioner.

6. The SVU according to claim 1, wherein the turret mounted positioner has an electromagnet for attaching to the container handling vehicle.

7. The SVU according to claim 1, wherein the SVU has a linear actuator, a pneumatic cylinder, or an electromotor driving a rack and pinion system for extending and retracting the turret mounted positioner.

8. The SVU according to claim 1, wherein the turret and the turret mounted positioner is controlled by a control box top module of the SVU.

9. The SVU according to claim 1, wherein the turret mounted positioner can be raised and lowered.

10. The SVU according to claim 1, wherein the centre of the wheels on the wheel module has spacers that register when the container handling vehicle is in position in the predetermined position on the grid.

11. The SVU according to claim 10, wherein the spacers register when the container handling vehicle is in position in the predetermined position on the grid by the container handling vehicle touching the spacers.

12. The SVU according to claim 1, wherein the predetermined position on the grid is either a vacant cell between the SVU and the container handling vehicle or a service area.

13. The SVU according to claim 1, wherein the turret mounted positioner has a stopper for ensuring that the turret mounted positioner does not rotate more than maximum 360°.

14. The SVU according to claim 13, wherein the stopper can be used for calibrating the position of the turret mounted positioner.

15. A method for operating a service vehicle unit (SVU) for maneuvering a container handling vehicle that has stalled on an automated storage and retrieval system, wherein the system comprises:

a rail system comprising a first set of parallel rails arranged to guide movement of a container handling vehicle in a first direction across the top of a frame structure, and a second set of parallel rails arranged perpendicular to the first set of rails to guide movement of the container handling vehicle in a second direction, which is perpendicular to the first direction, the first and second sets of parallel rails dividing the rail system into a plurality of grid cells, at least one container handling vehicle configured to operate on the rail system, wherein the SVU comprises a wheel module, which is configured to operate on the rail system, wherein the method comprises:

a. notifying, by a central computer system, the SVU about a stalled container handling vehicle b. sending, by the central computer system, the SVU to the last known position of the stalled container handling vehicle, c. positioning, by the central computer system, the SVU in relation to the container handling vehicle in such a way that a turret mounted positioner can be used to maneuver the container handling vehicle to a predetermined cell on the grid, d. repositioning, by the SVU, the stalled container handling vehicle, e. trying to restart the container handling vehicle using the central computer system from the predetermined position on the grid.

16. The method according to claim 15, wherein the repositioning of the container handling vehicle step further comprises:

f. the SVU extending the turret mounted positioner and coupling the turret mounted positioner to the stalled container handling vehicle, g. the SVU maneuvering the container handing vehicle using the turret to maneuver the container handling vehicle to a known position on the grid, h. the SVU decoupling the turret mounted positioner from the container handling vehicle.

17. The method according to claim 15, wherein the method comprises remotely controlling the SVU using an operator to locate the stalled container handling vehicle and to steer the SVU.

18. The method according to claim 15, wherein the method further comprises receiving images from a camera mounted to the end of a turret mounted positioner allowing the central computer system to maneuver the turret mounted positioner based on image recognition software applied to the images from the camera.

19. The method according to claim 15, wherein the method comprises extending and retracting the turret mounted positioner using a pneumatic cylinder powered by a pneumatic pump, an electric motor powering a rack and pinion system, or a linear actuator.

20. A storage and retrieval system for maneuvering a container handling vehicle that has stalled on an automated storage and retrieval system, wherein the system comprises:

a grid-based rail system comprising a first set of parallel rails arranged to guide movement of a container handling vehicle in a first direction across the top of a frame structure, and a second set of parallel rails arranged perpendicular to the first set of rails to guide movement of the container handling vehicle in a second direction, which is perpendicular to the first direction, the first and second sets of parallel rails dividing the rail system into a plurality of grid cells, and at least one container handling vehicle configured to operate on the rail system; and a service vehicle unit (SVU) comprising a wheel module configured with a first and second set of wheels, which enables movement of the container handling vehicle in the first and second direction and which is configured to operate on the rail system, wherein the SVU further comprises a turret and a turret mounted positioner that is attached to the wheel module, the turret being configured to move the turret mounted positioner to attach to the container handling vehicle, wherein the turret mounted positioner is configured for maneuvering a container handling vehicle to a predetermined position on the grid.

* * * * *